(12) United States Patent
Long

(10) Patent No.: US 9,156,161 B2
(45) Date of Patent: Oct. 13, 2015

(54) ROBOT ARM ASSEMBLY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Bo Long, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 24 days.

(21) Appl. No.: 14/215,150

(22) Filed: Mar. 17, 2014

(65) Prior Publication Data

US 2014/0290418 A1   Oct. 2, 2014

(30) Foreign Application Priority Data

Mar. 28, 2013   (CN) .......................... 2013 1 01036932

(51) Int. Cl.
| | |
|---|---|
| B25J 17/00 | (2006.01) |
| B25J 18/00 | (2006.01) |
| B25J 18/02 | (2006.01) |
| B25J 9/10 | (2006.01) |
| B25J 17/02 | (2006.01) |

(52) U.S. Cl.
CPC .............. B25J 9/103 (2013.01); B25J 17/0283 (2013.01); *Y10S 901/26* (2013.01); *Y10T 74/20329* (2015.01)

(58) Field of Classification Search
CPC .......... F16H 55/18; F16H 55/20; B25J 9/103; B25J 17/0283
USPC ..................... 74/395, 396, 406, 409
See application file for complete search history.

(56) References Cited

U.S. PATENT DOCUMENTS

| 4,806,069 | A | * | 2/1989 | Tellden .......................... 414/735 |
| 5,119,687 | A | * | 6/1992 | Naruoka et al. ............ 74/490.11 |
| 6,997,079 | B2 | * | 2/2006 | Nomura et al. .................. 74/440 |
| 7,748,288 | B2 | * | 7/2010 | Chevalier et al. ................ 74/409 |

* cited by examiner

*Primary Examiner* — Justin Krause
(74) *Attorney, Agent, or Firm* — Novak Druce Connolly Bove + Quigg LLP

(57) ABSTRACT

A robot arm assembly includes a first robot arm, a second robot arm, and a third robot arm. The first robot arm includes a first body and a backlash adjusting assembly received in the first body. The backlash adjusting assembly includes a base plate, a protruding shaft perpendicularly coupled to the base plate, and an adjusting member. The base plate defines a slotted hole. The adjusting member is detachably inserted into the slotted hole and is detachably coupled to first body. The second robot arm includes a second body and a first transmission assembly rotatably coupled to the second body. The first transmission assembly includes a first adjusting gear, a first intermediate gear, and a second adjusting gear. The first intermediate gear meshes the first and second adjusting gear. The second adjusting gear is coupled to the second body. The first intermediate gear is sleeved on the protruding shaft.

20 Claims, 3 Drawing Sheets

ROBOT ARM ASSEMBLY

FIELD

The present disclosure relates to robot arm assemblies, particularly to a robot arm assembly of a multi-axis robot.

BACKGROUND

A robot may includes a base and a plurality of robot arms coupled in order. For example, a six axes robot may include a fourth robot arm, a fifth robot arm, and a sixth robot arm. A driver is received in the fourth robot arm and is configured to drive the fifth robot arm. A belt transmission structure or a gear transmission structure may interconnect the driver and the fifth robot arm. The sixth robot arm is a performing part of the robot for assembling with a clamper, a cutter, and a detector, for example. When in use, the sixth robot arm may be impacted by other objects adjacent to the robot. When a belt transmission structure is used in the robot, because the belt transmission structure has a poor structural rigidity, the fifth robot arm may deviated from its normal position, and the inner elements (such as reducer, or bearing, for example) of the robot may be damaged. When a gear transmission structure is used in the robot, a backlash between gears of the gear transmission structure may increase, and results in a low position accuracy.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The term "coupled" is defined as connected, whether directly or indirectly through intervening components, and is not necessarily limited to physical connections. The connection can be such that the objects are permanently connected or releasably connected.

Figure 1:
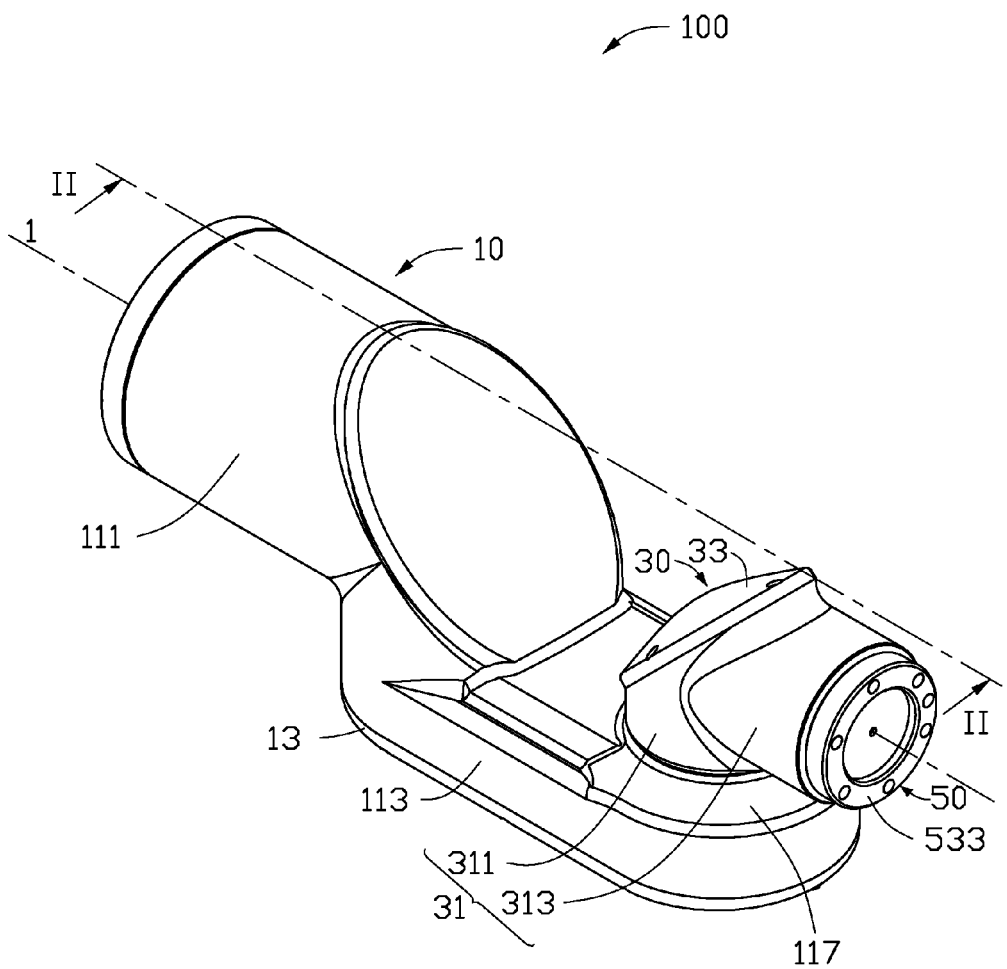
FIG. 1 is an isometric view of an embodiment of a robot arm assembly including a first cover.
Figure 2:
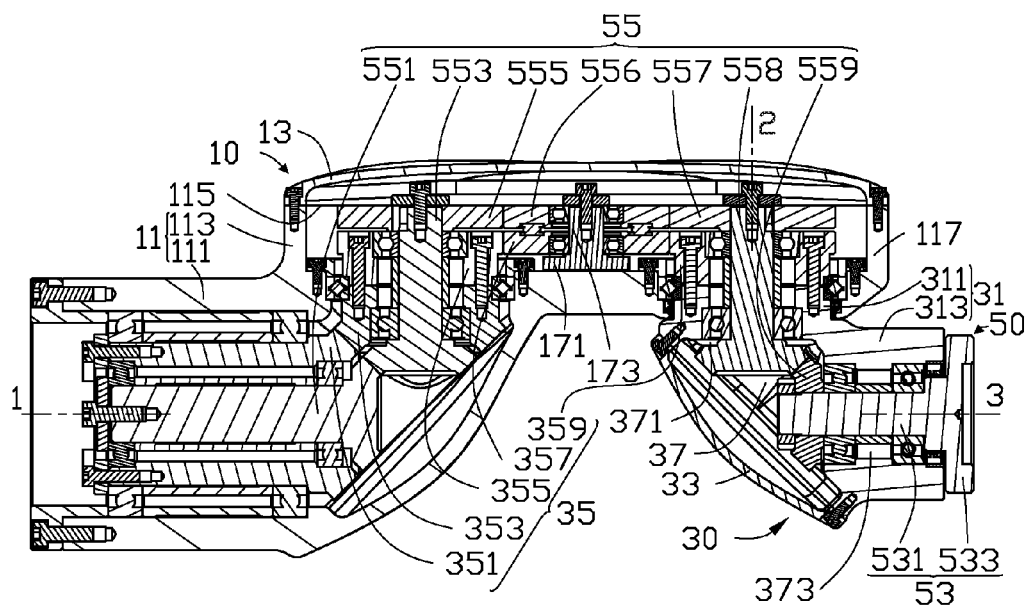
FIG. 2 is a sectional view of the robot arm assembly of FIG. 1, taken along line II-II.

FIGS. 1 and 2 show an embodiment of a robot arm assembly 100 including a first robot arm 10, a second robot arm 30, and a third robot arm 50. The first robot arm 10 and the third robot arm 50 can couple two ends of the second robot arm 30, respectively.

In the illustrated embodiment, the robot arm assembly 100 can be used in a six axis robot. The first robot arm 10 can be capable of rotating about a first axis 1, the second robot arm 30 can be capable of rotating about a second axis 2, and the third robot arm 50 can be capable of rotating about a third axis 3. The second axis 2 can be perpendicular to the first axis 1 and the third axis 3. The first axis 1 can be substantially coaxial with the third axis 3. The third robot arm 50 can be a performing part of the six axes robot and can be configured to assemble a cutter, or a clamp, for example.

The first robot arm 10 can include a first body 11, a first cover 13 covering the first body 11, and a backlash adjusting assembly 17 received in the first body 11.

The first body 11 can be a substantially Z-shaped hollow housing, and can include a first receiving portion 111 and a second receiving portion 113 substantially parallel to the first receiving portion 111. An end of the first receiving portion 111 can be coupled to an end of the second receiving portion 113. A center axis of the first receiving portion 111 can be the first axis 1. An outer sidewall of the second receiving portion 113, parallel to the first axis 1, can define an opening 115. In the illustrated embodiment, the opening 115 can be located at a side of the second receiving portion 113 away from the first receiving portion 111. In an alternative embodiment, the opening 115 can be located at a side of the second receiving portion 113 adjacent to the first receiving portion 111. The second receiving portion 113 can include a connecting portion 117 at an end away from the first receiving portion 111, for coupling with the second robot arm 30. The first cover 13 can cover the opening 115. The first cover 13 and the first body 11 can define a first receiving chamber 15, cooperatively.

Figure 3:
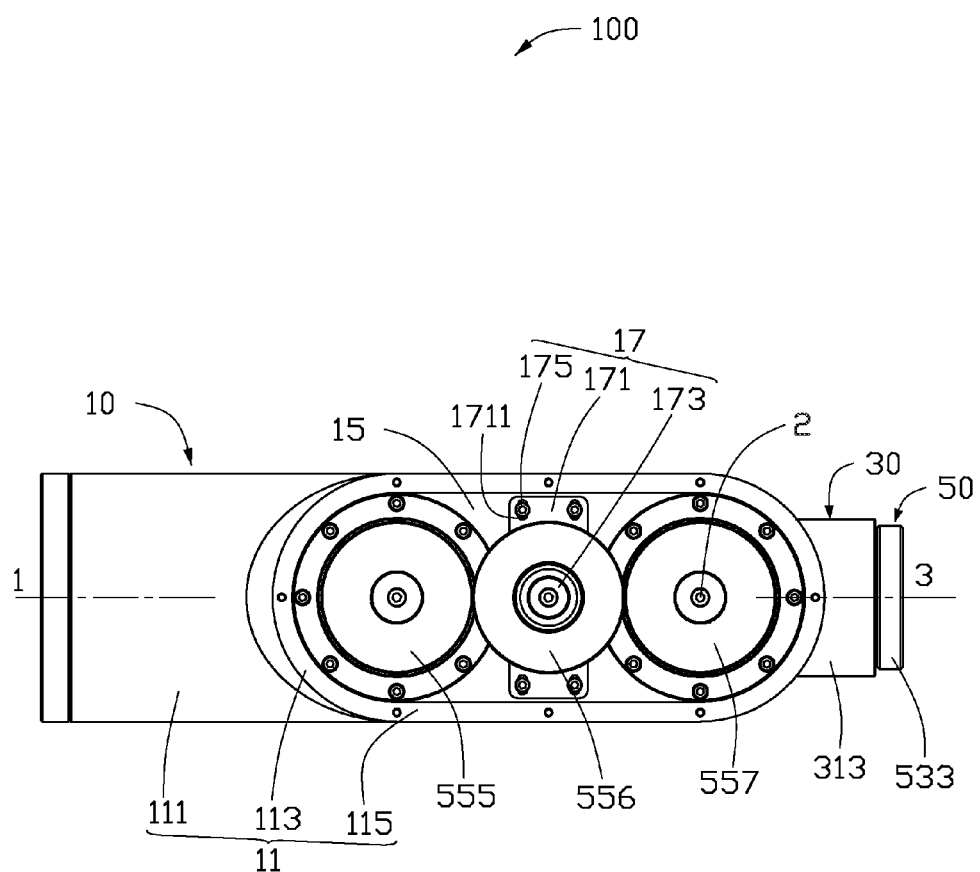
FIG. 3 is a side view of the robot arm assembly of FIG. 1 with the first cover removed.

FIG. 3 shows the backlash adjusting assembly 17. The backlash adjusting assembly 17 can be coupled to an inner sidewall of the second receiving portion 113 opposite to the opening 115, and can be received in the first receiving chamber 15, for adjusting a backlash between gears. The backlash adjusting assembly 17 can include a base plate 171, a protruding shaft 173 protruding from the base plate 171, and a plurality of adjusting members 175.

The base plate 171 can be substantially rectangular, and can define a plurality of adjusting holes 1711. In the illustrated embodiment, the adjusting holes 1711 are slotted holes, and the number of the adjusting holes 1711 is four. For example, an alternative embodiment, the adjusting holes 1711 can be kidney holes, rectangular holes. The protruding shaft 173 can be substantially columnar, and can protrude from a center of the base plate 171 towards the opening 115. The adjusting members 175 can be inserted into the adjusting holes 1711, and threaded with the inner sidewall of the second receiving portion 113, thereby the base plate 171 can be fixed to an inner sidewall of the first body 11. In the illustrated embodiment, the adjusting members 175 can be screws. When a position of the adjusting members 175 received in the adjusting holes 1711 is adjusted, a position of the base plate 171 relative to the second receiving portion 113 can be changed accordingly.

The second robot arm 30 can be rotatably coupled to the first robot arm 10, and can include a second body 31, a second cover 33 covering the second body 31, and a first transmission assembly 35 fixedly coupled to the second body 31.

The second body 31 can be a substantially L-shaped hollow housing, and can include a first connecting portion 311 and a second connecting portion 313 protruding from the first connecting portion 311. The first connecting portion 313 can be rotatably coupled to the connecting portion 117 of the first robot arm 10. A center axis of the first connecting portion 311 can be the second axis 2. The second connecting portion 313 can be substantially parallel to the first receiving portion 111.

The second body 31 can define an opening (not labeled) corresponding to the second cover 33, and the second cover 33 can cover the opening. The second body 31 and the second cover 33 can define a second receiving chamber 37, cooperatively. The second receiving chamber 37 can communicate with the first receiving chamber 15. The second receiving chamber 37 can include a first accepting portion 371 in the first connecting portion 311, and a second accepting portion 373 in the second connecting portion 373. The first accepting portion 371 can communicate with the second accepting portion 373.

The first transmission assembly 35 can be received in the first receiving chamber 15, and can include a first bevel gear 351, a second bevel gear 353, a first adjusting gear 355, a first intermediate gear 357, and a second adjusting gear 359. In the illustrated embodiment, the first adjusting gear 355, the first intermediate gear 357, and the second adjusting gear 359 are spur gears.

The first bevel gear 351 can be received in the first receiving portion 111, and can be rotatable about the first axis 1. The second bevel gear 353 can mesh with the first bevel gear 351, and a rotation axis of the second bevel gear 353 can be perpendicular to the first axis 1. The first adjusting gear 355 can be coaxially stacked on the second bevel gear 353, and can be received in the second receiving portion 113. The first adjusting gear 355 can be fixed to the second bevel gear 353. The first intermediate gear 357 can be rotatably sleeved on the protruding shaft 173 of the backlash adjusting assembly 17, and can mesh with the first adjusting gear 355. The second adjusting gear 359 can be located at a side of the first intermediate gear 357 away from the first adjusting gear 355, and can mesh with the first intermediate gear 357. A center axis of the second adjusting gear 359 can be the second axis 2. The first adjusting gear 355, the first intermediate gear 357, and the second adjusting gear 359 can be received in the second receiving portion 113 and can correspond to the opening 115. Observing or adjusting a backlash between the first adjusting gear 355 and a first intermediate gear, and a backlash between the first intermediate gear 357 and the second adjusting gear 359 can be convenient.

The third robot arm 50 can be rotatably coupled to the second robot arm 30, and can be partially received in the first receiving chamber 15 and the second receiving chamber 37. The third robot arm 50 can include a third body 53 and a second transmission assembly 55 coupled to the third body 53.

The third body 53 can include a slave portion 531 and a mounting portion 533 located at an end of the slave portion 531. The slave portion 531 can substantially be a rod, and can be rotatable about the third axis 3. The slave portion 531 can be received in the second accepting portion 373, and an end of the slave portion 531 opposite the mounting portion 533 can be fixed to the second transmission assembly 55. The mounting portion 533 can protrude from the second connecting portion 313 of the second body 31, and can be configured to assemble a cutter, or a clamp, for example.

The second transmission assembly 55 can be partly received in the first chamber 15, and can extend to the first accepting portion 371. The second transmission assembly 55 can include a third bevel gear 551, a fourth bevel gear 553, a third adjusting gear 555, a second intermediate gear 556, a fourth adjusting gear 557, a fifth bevel gear 558, and a sixth bevel gear 559. In the illustrated embodiment, the third adjusting gear 555, a second adjusting gear 556, and the fourth adjusting gear 557 are spur gears.

The third bevel gear 551 can be located along the first axis 1, and can be coaxially received in the first bevel gear 351. The fourth bevel gear 553 can mesh with the third bevel gear 351, and can be coaxially inserted into the second bevel gear 553 and the first adjusting gear 355. The third adjusting gear 555 can be fixedly sleeved on the fourth bevel gear 553, and can be stacked on the first adjusting gear 355 without interference, thus an axis of the third adjusting gear 555 can be perpendicular to the first axis 1. The second intermediate gear 556 can be rotatably sleeved on the protruding shaft 173 of the backlash adjusting assembly 17, and can be stacked on the first intermediate gear 357 without interference. The second intermediate gear 556 can mesh with the third adjusting gear 555. The fourth adjusting gear 557 can mesh with the second intermediate gear 556, and can be stacked on the second adjusting gear 359, thus an axis of the fourth adjusting gear 557 can overlap with the second axis 2. The third adjusting gear 555 and the fourth adjusting gear 557 can be located at opposite sides of the second intermediate gear 556. The fifth bevel gear 558 can be rotatably inserted into the second adjusting gear 359, and can be fixed to the fourth adjusting gear 557. Teeth of the fifth bevel gear 558 can extend out from the second receiving portion 113, and can extend to the first accepting portion 371. The sixth bevel gear 559 can be received in the first accepting portion 371, and can mesh with the fifth bevel gear 558. The fifth bevel gear 559 can be received in the first accepting portion 371, and can mesh with the fifth bevel gear 558. An axis of the sixth gear 559 can overlap with the third axis 3. The sixth bevel gear 559 can be fixedly sleeved on the slave portion 531 of the third body 53 to rotate the slave portion 531 and the mounting portion about the third axis 3.

In assembly, the base plate 171 of the backlash adjusting assembly 17 being mounted on the inner sidewall of the first body 11, and the adjusting members 175 can lock the base plate 171 and the first body 11. The third bevel gear 551 can be rotatably sleeved on the first bevel gear 351. The first bevel gear 351 and the third bevel gear 551 can be rotatably received in the first body 11 along the first axis 1. The fourth bevel gear 553 can mesh with the third bevel gear 551. The second bevel gear 353 can be rotatably sleeved on the fourth bevel gear 553, and can mesh with the first bevel gear 351. The first adjusting gear 355 can be rotatably sleeved on the fourth bevel gear 553, and can be stacked on the second bevel gear 353. The first intermediate gear 357 can be rotatably sleeved on the protruding shaft 173, and can mesh with the first adjusting gear 355. The third adjusting gear 555 can be securely sleeved on the fourth bevel gear 553, and can be stacked on the first adjusting gear 355. The second intermediate gear 556 can be rotatably sleeved on the protruding shaft 173, and can be stacked on the first intermediate gear 357 and can mesh with the third adjusting gear 555. The second adjusting gear 359 can be received in the first receiving chamber 15 along the second axis 2, and can mesh with the first intermediate gear 357. The fourth adjusting gear 557 can be stacked on the second adjusting gear 359, and can mesh with the second intermediate gear 556.

The first connecting portion 311 of the second body 31 can be inserted into the connecting portion 117 of the first body 11. The fifth bevel gear 558 can be rotatably received in the first accepting portion 371. A shaft portion of the fifth bevel gear 558 can be rotatably inserted into the second adjusting gear 359, and a distal end of the shaft portion of fifth bevel gear 558 can be fixed to the fourth adjusting gear 557. Teeth of the fifth bevel gear 558 can be received in the first accepting portion 371.

The sixth bevel gear 559 can be securely sleeved on the slave portion 531 of the third body 53. The sixth bevel gear 559 and the slave portion 531 can be positioned in the second accepting portion 373 along the third axis 3, and the sixth bevel gear 559 can mesh with the fifth bevel gear 558. The first cover 13 can cover the opening 115, and can lock with the first body 11. The second cover 33 can cover the opening defined on the second body 31, and can lock with the second body 31.

In use, when the first robot arm 10 rotates about the first axis 1, the first body 11 of the first robot arm 10 can rotate the second robot arm 30 and the third robot arm 50 about the first axis 1. When the first bevel gear 351 of the first transmission assembly 35 is rotated, the second robot arm 30 and the third robot arm 50 can be rotated about the second axis 2 driven by the second bevel gear 353, the first adjusting gear 355, the first intermediate gear 357, and the second adjusting gear 359. When the third bevel gear 551 of the second transmission assembly 55 is rotated, the third body 53 can rotates about the third axis 3 driven by the fourth bevel gear 553, the third adjusting gear 555, the second intermediate gear 556, the fourth adjusting gear 557, the fifth bevel gear 558, and the sixth bevel gear 559.

When a backlash occurs between the first transmission assembly 35 and the second transmission assembly 55 during use, the backlash can be adjusted. The first cover 13 can open and loosen the adjusting members 175. The base plate 171 can move along a direction perpendicular to a imaginary line connecting a center point of the first adjusting gear 355 and a center point of the second adjusting gear 359 (that is perpendicular to the first axis 1), and can relock the adjusting members 175. Therefore, a position of the base plate 171 relative to the second receiving portion 113 can be adjusted, and a distance between the first intermediated gear 357 and the first adjusting gear 355 can be decreased, and a distance between the first intermediated gear 357 and the second adjusting gear 359 can be decreased. In addition, a distance between the second intermediated gear 556 and the third adjusting gear 555 can be decreased. A distance between the second intermediated gear 556 and the fourth adjusting gear 557 can be decreased.

In an alternative embodiment, structures of the first transmission assembly 35 and the second transmission assembly 55 can be different, such as the fifth bevel gear 558 and the sixth bevel gear 559 can be omitted and the third adjusting gear 555, the second intermediate gear 556, and the fourth adjusting gear 557 can be bevel gears. A shape of the first body 11 can be other shapes, such as columnar. The first bevel gear 351, the second bevel gear 353, the third bevel gear 551, and the fourth bevel gear 553 can be replaced with spur gears.

It is believed that the present embodiments and their advantages will be understood from the foregoing description, and it will be apparent that various changes can be made thereto without departing from the spirit and scope of the embodiments or sacrificing all of its material advantages.

What is claimed is:

1. A robot arm assembly, comprising:
   a first robot arm comprising a first body and a backlash adjusting assembly mounted on an inner sidewall of the first body, the first body defining a first receiving chamber, the backlash adjusting assembly comprising a base plate, a protruding shaft protruding from the base plate, and an adjusting member, the base plate defining an adjusting hole, the adjusting member detachably inserted into the adjusting hole, and detachably coupled to the first body;
   a second robot arm rotatably coupled to the first robot arm, the second robot arm comprising a second body and a first transmission assembly rotatably coupled to the second body, the second body defining a second receiving chamber, the first transmission assembly comprising a first adjusting gear, a first intermediate gear, and a second adjusting gear received in the first receiving chamber and meshing in that order, the second adjusting gear coupled to the second body; and
   a third robot arm rotatably coupled to the second robot arm, and comprising a third body and a second transmission assembly coupled to the third body, the second transmission assembly comprising a third adjusting gear, a second intermediate gear, and a fourth adjusting gear received in the second receiving chamber and meshing in that order, the fourth adjusting gear coupled to the third body,
   wherein the first intermediate gear and the second intermediate gear are sleeved on the protruding shaft, and the second intermediate gear is stacked on the first intermediate gear, a position of the base plate relative to the first body is capable of being adjusted by adjusting a position of the adjusting member relative to the adjusting hole, thereby a backlash between the first intermediate gear and the first adjusting gear, a backlash between the first intermediate gear and the second adjusting gear, a backlash between the second intermediate gear and the third adjusting gear, and a backlash between the second intermediate gear and the fourth adjusting gear being adjusted.

2. The robot arm assembly of claim 1, wherein the adjusting hole is a slotted hole, and a longitudinal direction of the adjusting hole is perpendicular to an imaginary line connecting a center of the first adjusting gear and a center of the second adjusting gear.

3. The robot arm assembly of claim 1, wherein the adjusting member is inserted into the adjusting hole, and threaded with the first body.

4. The robot arm assembly of claim 1, wherein the first body is a substantially Z-shaped hollow housing, and includes a first receiving portion and a second receiving portion coupled to the first receiving portion, the first receiving portion and the second receiving portion forms the substantially Z-shaped hollow housing, cooperatively, the first receiving chamber is defined by the first receiving portion and the second receiving portion, cooperatively, the first transmission assembly is received in the first receiving portion and the second receiving portion.

5. The robot arm assembly of claim 4, wherein the first robot arm further comprises a first cover, the second receiving portion defines an opening at a sidewall parallel to a center axis of the first receiving portion, the first cover covers the opening, the base plate is fixed on an inner sidewall of the second receiving portion corresponding to the opening, the protruding shaft protrudes from the base plate towards the opening.

6. The robot arm assembly of claim 4, wherein the first transmission assembly further comprises a first bevel gear and a second bevel gear, the first bevel gear is rotatably received in the first receiving portion, the second bevel gear meshes with the first bevel gear, and fixed to the first adjusting gear.

7. The robot arm assembly of claim 6, wherein the second body further comprises a first connecting portion adjacent to the second receiving portion, and a second connecting portion protruding from the first connecting portion, the second adjusting gear is fixed to the first connecting portion.

8. The robot arm assembly of claim 7, wherein the second transmission assembly further comprises a third bevel gear, a fourth bevel gear, a fifth bevel gear, and a sixth bevel gear, the third bevel gear is rotatably received in the first receiving portion, the fourth bevel gear meshes with the third bevel gear and is inserted into the third adjusting gear, the fifth gear is inserted into the fourth bevel gear and is received in the first connecting portion, the sixth bevel gear meshes with the fifth bevel gear and is coupled to the third body.

9. The robot arm assembly of claim 8, wherein the third body further comprises a slave portion and a mounting portion coupled to an end of the slave portion, the slave portion is rotatably inserted into the second connecting portion, the sixth bevel gear is sleeved on the slave portion.

10. The robot arm assembly of claim 8, wherein the third bevel gear is rotatably inserted into the first bevel gear, the fourth bevel gear is rotatably inserted into the second bevel gear, the first adjusting gear is fixed to the third adjusting gear, the fifth bevel gear is rotatably inserted into the second adjusting gear, and fixed to the fourth adjusting gear.

11. A robot arm assembly, comprising:
a first robot arm comprising a first body and a backlash adjusting assembly received in the first body, the backlash adjusting assembly comprising a base plate, a protruding shaft perpendicularly coupled to the base plate, and an adjusting member, the base plate defining a slotted hole, the adjusting member detachably inserted into the slotted hole, and detachably coupled to the first body;
a second robot arm rotatably coupled to the first robot arm, the second robot arm comprising a second body and a first transmission assembly rotatably coupled to the second body, the first transmission assembly comprising a first adjusting gear, a first intermediate gear, and a second adjusting gear, the first intermediate gear sleeved on the protruding shaft, and meshing the first adjusting gear and the second adjusting gear, the second adjusting gear coupled to the second body; and
a third robot arm rotatably coupled to the second robot arm, wherein a position of the base plate relative to the first body is capable of being adjusted by adjusting a position of the adjusting member relative to the slotted hole, thereby a backlash between the first intermediate gear and the first adjusting gear, a backlash between the first intermediate gear and the second adjusting gear being adjusted.

12. The robot arm assembly of claim 11, wherein the third robot arm further comprises a third body and a second transmission assembly coupled to the third body, the second transmission assembly comprises a third adjusting gear, a second intermediate gear, and a fourth adjusting gear meshing in that order, the fourth adjusting gear coupled to the third body, the second intermediate gear is sleeved on the protruding shaft, and stacked on the first intermediate gear.

13. The robot arm assembly of claim 11, wherein a longitudinal direction of the slotted hole is perpendicular to an imaginary line connecting a center of the first adjusting gear and a center of the second adjusting gear, the adjusting member is inserted into the slotted hole, and threaded with the first body.

14. The robot arm assembly of claim 12, wherein the first body is a substantially Z-shaped shaped hollow housing, and includes a first receiving portion and a second receiving portion coupled to the first receiving portion, the first receiving portion and the second receiving portion forms the substantially Z-shaped hollow housing, cooperatively, the first transmission assembly is received in the first receiving portion and the second receiving portion.

15. The robot arm assembly of claim 14, wherein the first robot arm further comprises a first cover, the second receiving portion defines an opening at a sidewall parallel to a center axis of the first receiving portion, the first cover covers the opening, the base plate is fixed on an inner sidewall of the second receiving portion corresponding to the opening, the protruding shaft protrudes from the base plate towards the opening.

16. The robot arm assembly of claim 14, wherein the first transmission assembly further comprises a first bevel gear and a second bevel gear, the first bevel gear is rotatably received in the first receiving portion, and the second bevel gear meshes with the first bevel gear and is fixed to the first adjusting gear.

17. The robot arm assembly of claim 16, wherein the second body further comprises a first connecting portion adjacent to the second receiving portion, and a second connecting portion protruding from the first connecting portion, the second adjusting gear is fixed to the first connecting portion.

18. The robot arm assembly of claim 17, wherein the second transmission assembly further comprises a third bevel gear, a fourth bevel gear, a fifth bevel gear, and a sixth bevel gear, the third bevel gear is rotatably received in the first receiving portion, the fourth bevel gear meshes with the third bevel gear and is inserted into the third adjusting gear, the fifth gear is inserted into the fourth bevel gear and is received in the first connecting portion, the sixth bevel gear meshes with the fifth bevel gear and coupled to the third body.

19. The robot arm assembly of claim 18, wherein the third body further comprises a slave portion and a mounting portion coupled to an end of the slave portion, the slave portion is rotatably inserted into the second connecting portion, the sixth bevel gear is sleeved on the slave portion, the mounting portion extends out from the second connecting portion.

20. The robot arm assembly of claim 18, wherein the third bevel gear is rotatably inserted into the first bevel gear, the fourth bevel gear is rotatably inserted into the second bevel gear, the first adjusting gear is fixed to the third adjusting gear, the fifth bevel gear is rotatably inserted into the second adjusting gear and is fixed to the fourth adjusting gear.

* * * * *